United States Patent
Belvin et al.

(10) Patent No.: US 7,793,155 B2
(45) Date of Patent: Sep. 7, 2010

(54) AUTOMATED SOFTWARE TESTING VIA MULTI-CHANNEL REMOTE COMPUTING

(75) Inventors: Marcus L. Belvin, Raleigh, NC (US); Christopher M. Broglie, Doylestown, PA (US); Michael J. Frederick, San Diego, CA (US); David J. Hawkey, Schenectady, NY (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 11/776,619

(22) Filed: Jul. 12, 2007

(65) Prior Publication Data

US 2009/0019315 A1 Jan. 15, 2009

(51) Int. Cl.
*G06F 11/00* (2006.01)
(52) U.S. Cl. .................................................. 714/38
(58) Field of Classification Search .................... 714/38
See application file for complete search history.

(56) References Cited

U.S. PATENT DOCUMENTS 7,337,431 B1 *  2/2008  Barnes et al. ............... 717/124
2008/0209275 A1 *  8/2008  Kwan et al. .................. 714/38

* cited by examiner

*Primary Examiner*—Bryce P Bonzo
(74) *Attorney, Agent, or Firm*—Joseph E. Bracken, Esq.; Steven M. Greenberg, Esq.; Carey Rodriguez Greenberg & Paul LLP

(57) ABSTRACT

Embodiments of the present invention address deficiencies of the art in respect to software functional testing and provide a method, system and computer program product for automated software functional testing via multi-channel remote computing. In one embodiment of the invention, an automated software functional testing data processing system can be provided. The system can include a multi-user operating platform supporting multiple different user sessions configured for communicative coupling to corresponding remote desktops, and a test driver disposed in at least one of the remote desktops. In particular, the test driver can include program code enabled to forward test inputs to an application under test (AUT) executing in one of the user sessions, and to log received test outputs resulting from the test inputs.

8 Claims, 2 Drawing Sheets

AUTOMATED SOFTWARE TESTING VIA MULTI-CHANNEL REMOTE COMPUTING

BACKGROUND OF THE INVENTION

1. Field of the Invention

The present invention relates to the field of automated software testing and more particularly to software functional testing.

2. Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

In operation, the conventional functional testing tool in a "GUI driving" mode can monitor and record the interaction between end user and GUI during a recording phase of functional testing. In this regard, a testing script can be produced based upon the identity of GUI elements addressed by the end user and the sequence in which the GUI elements are addressed. Within the script, GUI elements, referred to herein as "objects", can be identified by absolute reference to each object. The absolute reference can include any number of element properties which, when combined with one another, can uniquely identify the desired object. Properties can include any explicit object property such as a data or method member, or any metadata associated with the object.

The GUI driving mode can be resource consumptive. In this regard, replaying GUI driving scripts can require the full use of the host computing platform since the emulation of mouse and keyboard events interfere with accepting any additional input through the GUI of the host computing platform. Additionally, the software-under-test during GUI driving must have current focus in the desktop environment so that windowing events can be received by the test tool. The exclusive nature of GUI driving test tools also can limit the use of the host computing platform to only one test running at a given time.

BRIEF SUMMARY OF THE INVENTION

Embodiments of the present invention address deficiencies of the art in respect to software functional testing and provide a novel and non-obvious method, system and computer program product for automated software functional testing via multi-channel remote computing. In one embodiment of the invention, an automated software functional testing data processing system can be provided. The system can include a multi-user operating platform supporting multiple different user sessions configured for communicative coupling to corresponding remote desktops, and a test driver disposed in at least one of the remote desktops. In particular, the test driver can include program code enabled to forward test inputs to an application under test (AUT) executing in one of the user sessions, and to report received test outputs resulting from the test inputs, including logging the received test outputs.

In another embodiment of the invention, an automated software functional testing method can be provided. The method can include establishing a remote computing channel between a remote desktop in a client computing device and a user session in a multi-protocol operating platform, executing an AUT in the user session, forwarding test inputs to the AUT from the remote desktop, and logging resulting test outputs received through the remote desktop. In one aspect of the embodiment, a different remote computing channel can be established between a different remote desktop in the client computing device and a different user session in the multi-protocol operating platform, a different AUT can be executed in the different user session, test inputs can be forwarded to the different AUT from the different remote desktop, and resulting test outputs can be received through the different remote desktop.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for automated software testing via multi-channel remote computing. In accordance with an embodiment of the present invention, an application under test can be software functional tested via a communications channel established between an AUT disposed in a user session of a multi-channel remote computing server and a functional tester disposed externally to multi-channel remote computing server according to a multi-channel remote computing protocol. For example, a remote desktop protocol (RDP) compliant channel can be established with a user session for an executing terminal server environment. An AUT can be launched within the user session and test tasks can be routed from a software functional testing tool over the channel to the AUT. Results from the test tasks can be captured within the user session and routed out of the user session over the channel to the software functional testing tool. In this way, the computing platform hosting the software functional testing tool need not remain focused so that other applications can co-execute with the functional testing tool and can enjoy focus in the computing platform as required.

Figure 1:
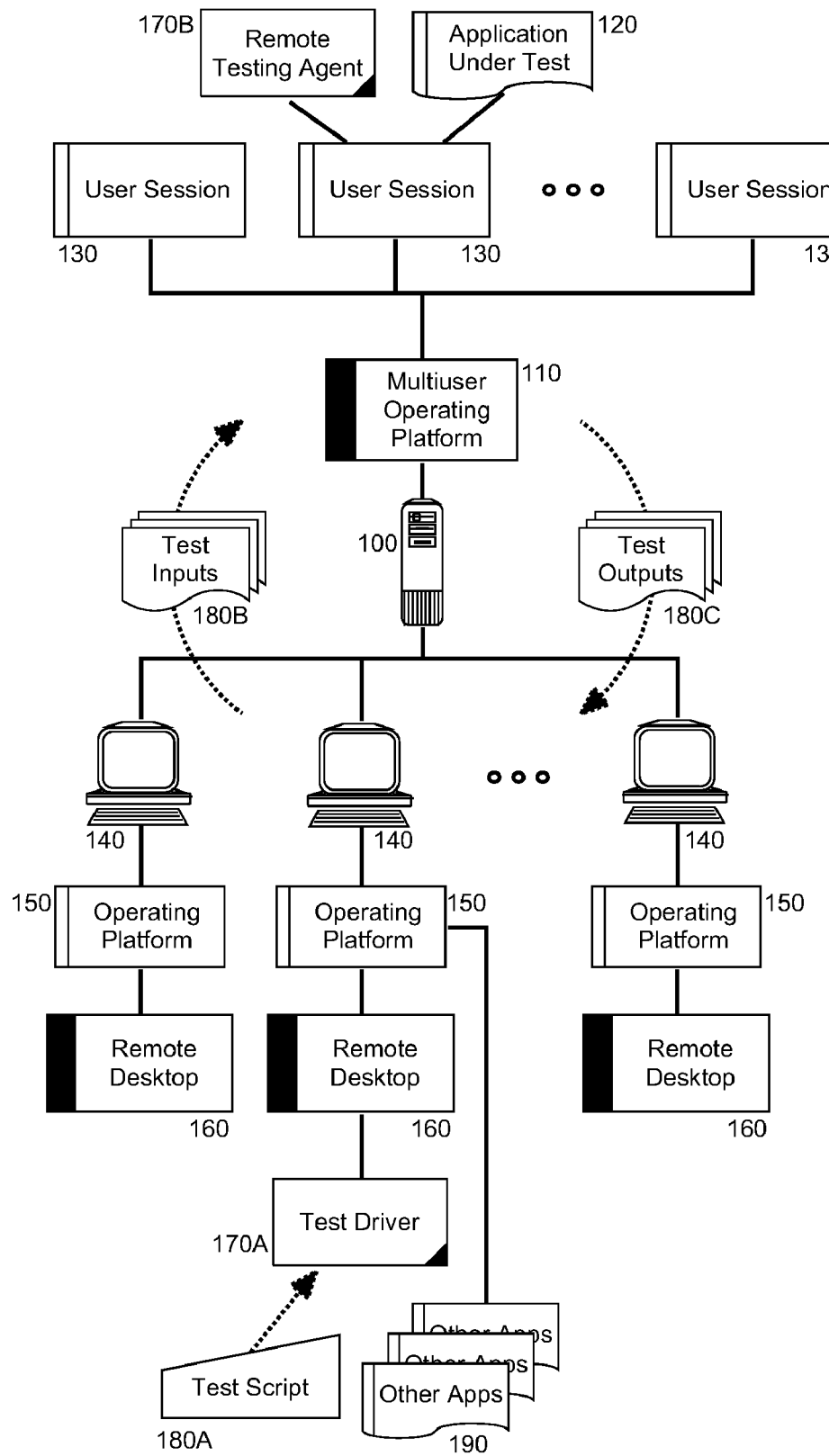
FIG. 1 is a schematic illustration of a software functional testing data processing system configured for automated software testing via multi-channel remote computing; and, FIG. 2 is a flow chart illustrating a process for automated software testing via multi-channel remote computing.

In illustration, FIG. 1 is schematically depicts a software functional testing data processing system configured for automated software testing via multi-channel remote computing. The system can include a server computing platform 100 hosting the operation of a multi-user operating platform, for example Terminal Server™ manufactured by Microsoft Corporation of Redmond, Wash. The server computing platform can be coupled to one or more client computing devices 140 in a network configuration. The network configuration can include a local area network, or a wide area network, or any combination thereof In one aspect of the invention, one or more of the client computing devices 140 can be communicatively coupled to the server computing platform 100 over the global Internet.

Each of the client computing devices 140 can include an operating platform 150 such as an operating system or virtual machine, and at least one of the client computing devices 140 can include a remote desktop 160 executing in a respective operating platform 150. The remote desktop 160 can include a configuration to establish a user session 130 in the multi-user operating platform 110 and to support a communicative channel with the user session 130. In this regard, user interface events such as mouse movements, mouse clicks and keyboard strokes can be passed from the remote desktop 160 over the channel to the user session wherein the user interface events are treated as if the user interface events originated in the server computing platform. Likewise, a resulting display in the user session 130 can be provided over the channel to the remote desktop 160 for viewing within a display of a corresponding one of the client computing devices 140.

Notably, a test driver 170A can execute in the operating platform 150 concurrently with the execution of the remote desktop 160 and optionally additional applications 190. The test driver 170 can include a software functional testing tool such as a GUI driver programmed to test an application with a series of user interface stimuli and to record the results therefrom, comparing the recorded results to expected results to identify anomalies. To provided automated software functional testing, the test driver 170A further can be enabled to process a test script 180A defining a sequence of user interface stimuli to be applied to an application. Advanced forms of the test script 180A can provide conditional logic to determine which user interface stimuli are to be applied to an application.

In at least one user session 130 of the multi-user operating platform, an AUT 120 can execute. Concurrently with the execution of the AUT 120, also a remote testing agent 170B can execute in the same user session 130. The test driver 170A and the remote testing agent 170B can combine to facilitate the software functional testing of the AUT 120 in the user session 130 of the multi-user operating platform 110. In this regard, test input 180B provided by the test driver 170A in accordance with the test script 180A can be provided over the remote computing channel to the user session and applied to the AUT 120. Test outputs 180C resulting from the test inputs 180B can be collected by the remote testing agent 170B and returned to the test driver 170A over the remote computing channel.

Figure 2:
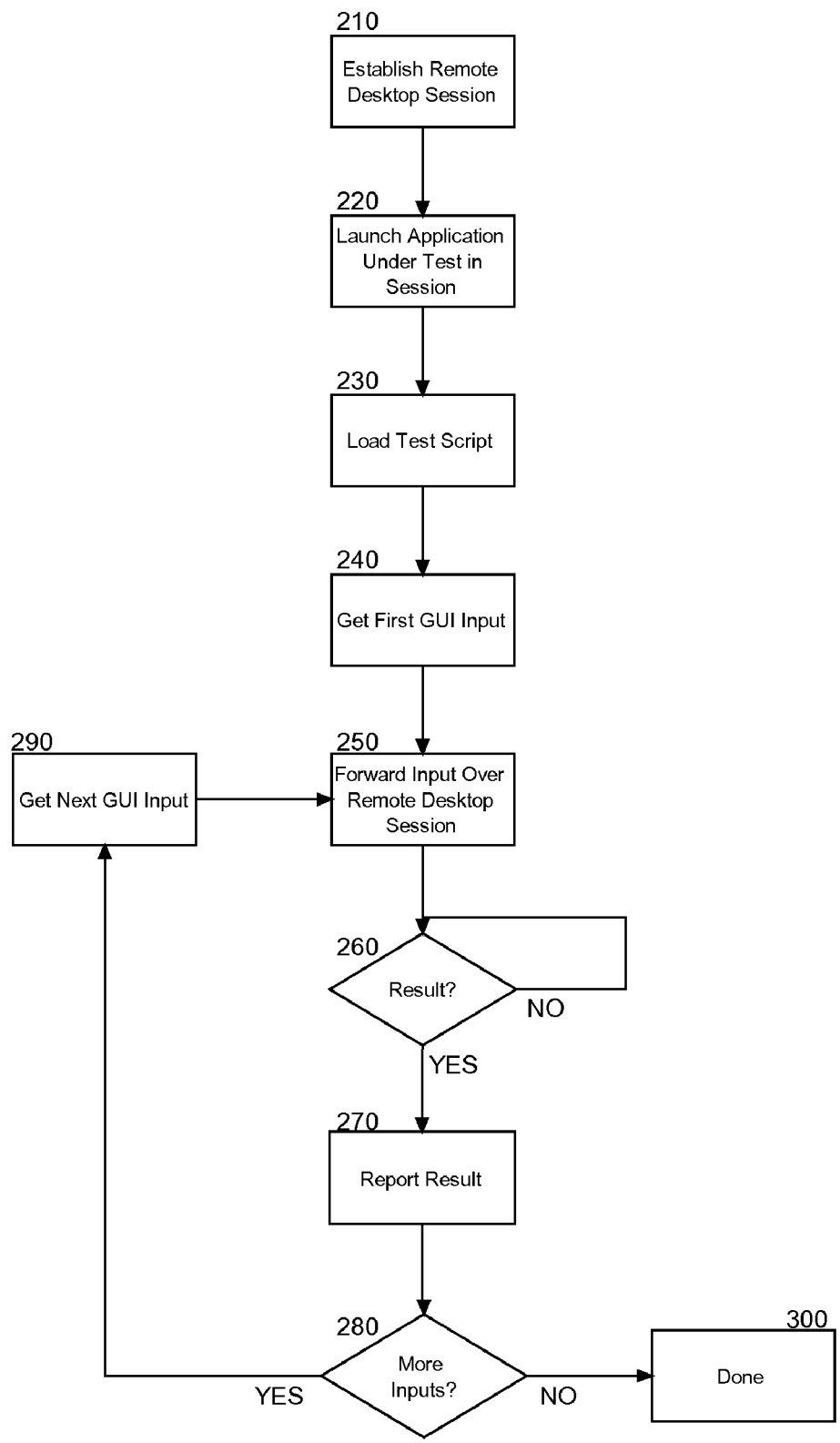

In this way, the test driver 170A can perform automated software functional testing of the AUT 120 while allowing the other applications 190 to execute in the operating platform 150. Moreover, multiple different instances of the test driver 170A can operate concurrently in the same operating platform 150 to perform software functional testing of multiple different applications in addition to the AUT 120 in multiple different user sessions 130 of the multi-user operating platform 110. In yet further illustration, FIG. 2 is a flow chart illustrating a process for automated software testing via multi-channel remote computing.

Beginning in block 210, a remote desktop session can be established for a user session in a multi-user operating platform. In block 220, an AUT can be launched in the user session. In block 230, a test script can be loaded for execution and in block 240 a first GUI input can be retrieved from the test script. In block 250, the retrieved GUI input can be forwarded over the communications channel established between the remote desktop session and the user session to be applied to the AUT. In decision block 260, if a result is received for the GUI input, in block 270 the result can be logged and the process can repeat through decision block 280 and block 290 for additional GUI inputs provided by the test script. When no further GUI inputs remain to be processed in the test script, the process can end in block 300.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An automated software functional testing data processing system comprising:

a multi-user operating platform executing in a server computing device with memory and at least one processor, the multi-user operating platform supporting a plurality of remote desktop user sessions executing in the memory of the server and configured for communicative coupling to corresponding remote desktops separately executing in different computing clients from over a computer communications network;

an application under test (AUT) executing in the memory of the server and accessed by at least one of the remote desktop user sessions;

a remote testing agent executing in the memory of the server concurrently with the execution of the AUT; and, a test driver disposed in at least one of the remote desktops and accessing the multi-user operating platform through a remote desktop user session to the multi-user operating platform, the test driver comprising program code enabled to forward test inputs to the AUT by way of the remote testing agent, and to log received test outputs resulting from the test inputs.

2. The system of claim 1, further comprising a remote testing agent disposed in one of the user sessions, the remote testing agent comprising program code enabled to provide the test outputs to the test driver in the remote desktop.

3. The system of claim 1, wherein the multi-user operating platform is a terminal server communicatively coupled to the remote desktops using the remote desktop protocol (RDP).

4. The system of claim 1, further comprising a test script utilized by the test driver.

5. An automated software functional testing method comprising:
    establishing two different remote desktop computing channels between two different remote desktops in respectively different client computing devices and a terminal server;
    executing an application under test (AUT) in the terminal server using the remote desktop protocol (RDP);
    forwarding test inputs to the AUT from only one of the remote desktops; and,
    reporting resulting test outputs received through the only one of the remote desktops.

6. The method of claim 5, wherein forwarding test inputs to the AUT from the only one of the remote desktop, comprises:
    loading a test script for software functional testing the AUT; and,
    repeatedly forwarding test inputs to the AUT from the only one of the remote desktop as specified by the test script.

7. A computer program product comprising a computer usable medium embodying computer usable program code for automated software functional testing, the computer program product comprising:
    computer usable program code for establishing two different remote desktop computing channels between two different remote desktops in respectively different client computing devices and a terminal server using the remote desktop protocol (RDP);
    computer usable program code for executing an application under test (AUT) in the terminal server;
    computer usable program code for forwarding test inputs to the AUT from only one of the remote desktops; and,
    computer usable program code for reporting resulting test outputs received through the only one of the remote desktops.

8. The computer program product of claim 7, wherein the computer usable program code for forwarding test inputs to the AUT from the only one of the remote desktop, comprises:
    computer usable program code for loading a test script for software functional testing the AUT; and,
    computer usable program code for repeatedly forwarding test inputs to the AUT from the only one of the remote desktop as specified by the test script.

* * * * *